(12) United States Patent
Vogt

(10) Patent No.: US 11,548,336 B1
(45) Date of Patent: Jan. 10, 2023

(54) SUSPENSION SYSTEM HAVING REBOUND CONTROL FOR A VEHICLE

(71) Applicant: GM Global Technology Operations LLC, Detroit, MI (US)

(72) Inventor: Jeffery L. Vogt, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/460,456

(22) Filed: Aug. 30, 2021

(51) Int. Cl.
*B60G 3/20* (2006.01)
*B60G 7/04* (2006.01)
*B60G 7/02* (2006.01)

(52) U.S. Cl.
CPC ............... *B60G 3/20* (2013.01); *B60G 7/02* (2013.01); *B60G 7/04* (2013.01); *B60G 2200/144* (2013.01); *B60G 2204/143* (2013.01); *B60G 2204/43* (2013.01); *B60G 2204/45* (2013.01)

(58) Field of Classification Search
CPC ...... B60G 2204/4502; B60G 2204/129; B60G 2202/143; B60G 11/22; B60G 2200/144; B60G 7/04; B60G 2204/45; B60G 3/20
See application file for complete search history.

(56) References Cited

U.S. PATENT DOCUMENTS

| | | | | | |
|---|---|---|---|---|---|
| 2,122,476 | A | * | 7/1938 | Leighton | B60G 7/001 280/124.141 |
| 5,658,006 | A | * | 8/1997 | Freeman | F16F 1/12 280/124.179 |
| 6,488,110 | B2 | * | 12/2002 | Price | B60G 7/04 180/251 |
| 2006/0244235 | A1 | * | 11/2006 | Kusaka | B60G 7/02 280/5.521 |
| 2019/0126701 | A1 | * | 5/2019 | Tokach | B60G 3/20 |
| 2021/0129618 | A1 | * | 5/2021 | Wietharn | B60G 5/04 |
| 2021/0339591 | A1 | * | 11/2021 | Li | B60G 7/001 |
| 2022/0219781 | A1 | * | 7/2022 | Bougie | B62M 27/02 |

* cited by examiner

*Primary Examiner* — Paul N Dickson
*Assistant Examiner* — Maxwell L Meshaka
(74) *Attorney, Agent, or Firm* — Cantor Colburn LLP

(57) ABSTRACT

A vehicle suspension system for a vehicle having a body supported on a frame includes a first suspension component having a surface and a bracket cantilevered from the surface, a second suspension component including a surface portion, and a spring element mounted to one of the bracket and the surface portion of the second suspension component. Interaction between the spring element and the another of the bracket and the surface portion of the second suspension component limits upward travel of the body of the vehicle.

20 Claims, 5 Drawing Sheets

SUSPENSION SYSTEM HAVING REBOUND CONTROL FOR A VEHICLE

INTRODUCTION

The subject disclosure relates to vehicle suspension systems and, more particularly, to a suspension system having rebound control.

Vehicles include various suspension systems that mitigate force transfer from a road to a passenger compartment. Springs, shock absorbers, bushings, jounce bumpers, and the like absorb forces input to the suspension through vehicle tires. The aforementioned components dampen tire movement toward a body of the vehicle (jounce) and, to some extent, control rebound forces of tire movement away from the body (rebound).

Tires also move away from a vehicle particularly during a rapid acceleration. Suspension forces generated during a rapid longitudinal acceleration of the vehicle may cause a front portion of the vehicle body to rise. Typically, forward acceleration forces are not high enough to raise the front portion of the vehicle high enough so as to block a driver's forward view or unload front tires and limit tractive capability. Shock absorbers, suspension springs (air or coil) and the like arrest a portion of the upward movement.

Modern vehicles, particularly electric vehicles, possess an acceleration rate that may overwhelm existing suspension system components allowing the front portion of the vehicle to rise and block a drivers view or unload the front tires and limit tractive capability. Thus, it is desirable to provide a rebound control system that can limit the rise of the front of the vehicle and control the load transfer forces from front wheels into the front portion of the vehicle body during longitudinal acceleration or general ride motion due to uneven road surfaces.

SUMMARY

Disclosed is a vehicle suspension system for a vehicle having a body supported on a frame. The vehicle suspension system includes a first suspension component having a surface and a bracket cantilevered from the surface, a second suspension component including a surface portion, and a spring element mounted to one of the bracket and the surface portion of the second suspension component. Interaction between the spring element and the another of the bracket and the surface portion of the second suspension component limits upward travel of the body of the vehicle.

In addition to one or more of the features described above or below, or as an alternative, further embodiments could include wherein the first suspension component is pivotally mounted to the frame and the second suspension component includes a portion of the frame.

In addition to one or more of the features described above or below, or as an alternative, further embodiments could include wherein the surface defines a lower surface of the first suspension component.

In addition to one or more of the features described above or below, or as an alternative, further embodiments could include wherein the first suspension component comprises a lower control arm.

In addition to one or more of the features described above or below, or as an alternative, further embodiments could include wherein the bracket comprises a paddle cantilevered from the lower surface of the lower control arm and the spring element is mounted to the surface portion of the second suspension component.

In addition to one or more of the features described above or below, or as an alternative, further embodiments could include wherein the second suspension component comprises the frame.

In addition to one or more of the features described above or below, or as an alternative, further embodiments could include wherein the second suspension component is pivotally mounted to the frame.

In addition to one or more of the features described above or below, or as an alternative, further embodiments could include wherein the first suspension component comprises the frame and the second suspension component comprises one of an upper control arm and a lower control arm.

In addition to one or more of the features described above or below, or as an alternative, further embodiments could include wherein the surface portion comprises a lower surface portion of the one of the upper control arm and the lower control arm.

In addition to one or more of the features described above or below, or as an alternative, further embodiments could include wherein the spring element is mounted to the bracket.

Also disclosed is a vehicle including a frame, a body supported by the frame, a plurality of wheels connected to the frame, and a suspension system operatively connected between the plurality of wheels and the frame. The suspension system includes a first suspension component having a surface and a bracket cantilevered from the surface, a second suspension component including a surface portion, and a spring element mounted to one of the bracket and the surface portion of the second suspension component. Interaction between the spring element and the another of the bracket and the surface portion limits upward travel of the body of the vehicle.

In addition to one or more of the features described above or below, or as an alternative, further embodiments could include wherein the first suspension component is pivotally mounted to the frame and the second suspension component includes a portion of the frame.

In addition to one or more of the features described above or below, or as an alternative, further embodiments could include wherein the surface defines a lower surface of the first suspension component.

In addition to one or more of the features described above or below, or as an alternative, further embodiments could include wherein the first suspension component comprises a lower control arm.

In addition to one or more of the features described above or below, or as an alternative, further embodiments could include wherein the bracket comprises a paddle cantilevered from the lower surface of the lower control arm and the spring element is mounted to the surface portion of the second suspension component.

In addition to one or more of the features described above or below, or as an alternative, further embodiments could include wherein the second suspension component comprises the frame.

In addition to one or more of the features described above or below, or as an alternative, further embodiments could include wherein the second suspension component is pivotally mounted to the frame.

In addition to one or more of the features described above or below, or as an alternative, further embodiments could include wherein the first suspension component comprises the frame and the second suspension component comprises one of an upper control arm and a lower control arm.

In addition to one or more of the features described above or below, or as an alternative, further embodiments could include wherein the surface portion comprises a lower surface portion of the one of the upper control arm and the lower control arm.

In addition to one or more of the features described above or below, or as an alternative, further embodiments could include wherein the spring element is mounted to the bracket.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
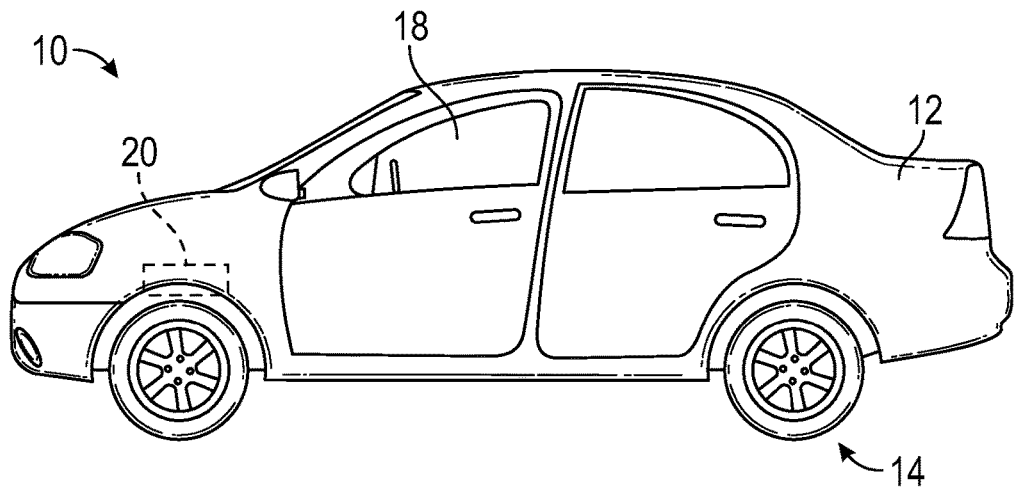
FIG. 1 depicts a vehicle having a suspension system with a rebound control device, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 and a plurality of wheels, indicated generally at 14. Body 12 includes a passenger compartment 18 and may be connected to wheels 14 through a variety of structures. In one non-limiting example, vehicle 10 may include a frame 16 (FIG. 2) that is coupled to the plurality of wheels through a suspension system 20. In accordance with another non-limiting example body 12 may include an integral frame (not shown) with suspension system 20 being connected between the plurality of wheels 14 and a cradle (not shown) coupled to body 12. At this point, it should be understood that the term "frame" covers both an external frame as well as an integral frame/cradle arrangement. Suspension system 20 provides a mechanical connection between wheels 14 and body 12. Suspension system 20 absorbs both jounce and rebound forces between the wheels 14 and body 12.

Figure 2:
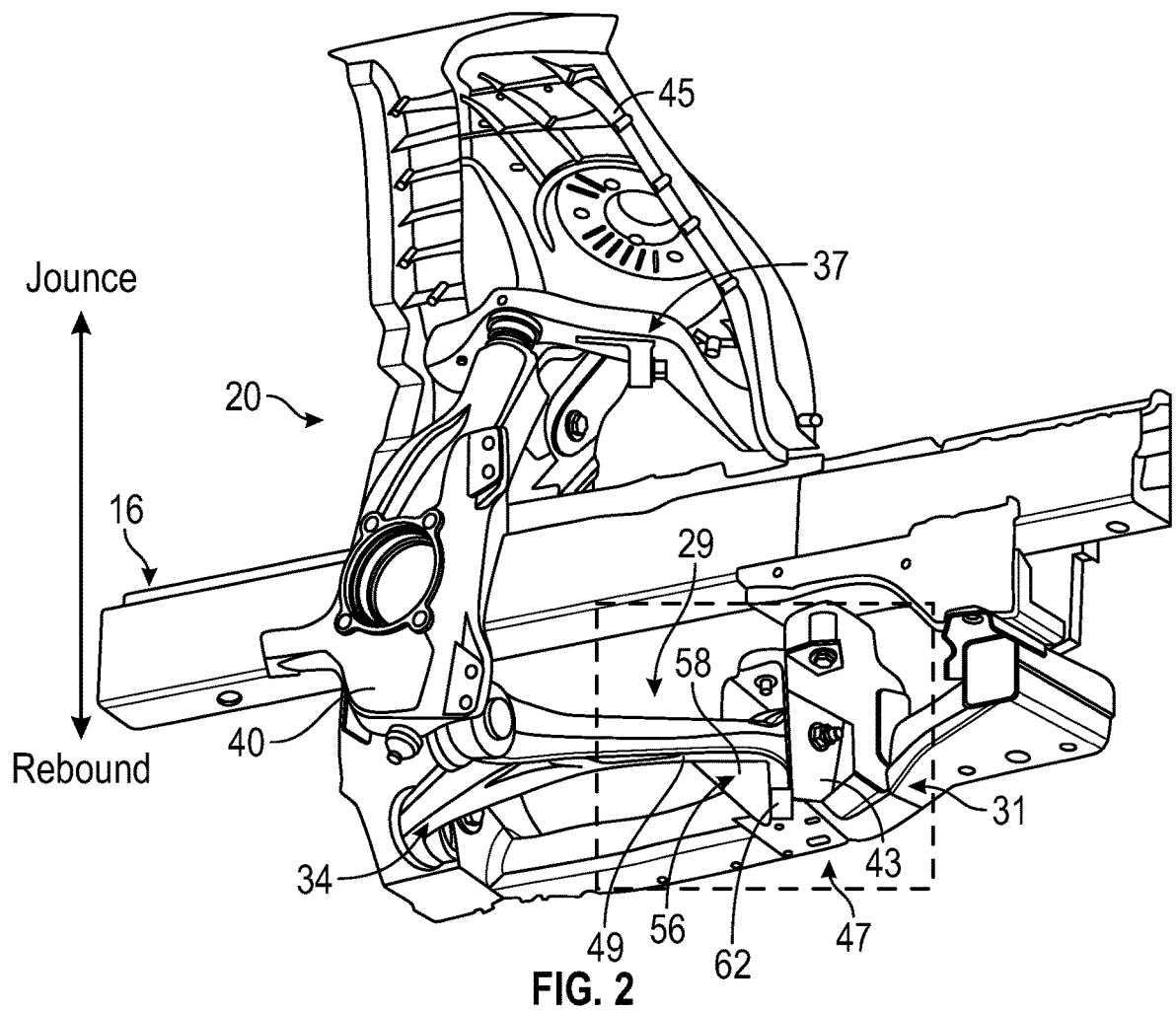
FIG. 2 depicts the suspension system with a rebound control device integrated between a lower control arm and a frame of the vehicle, in accordance with a non-limiting example.
Figure 3:
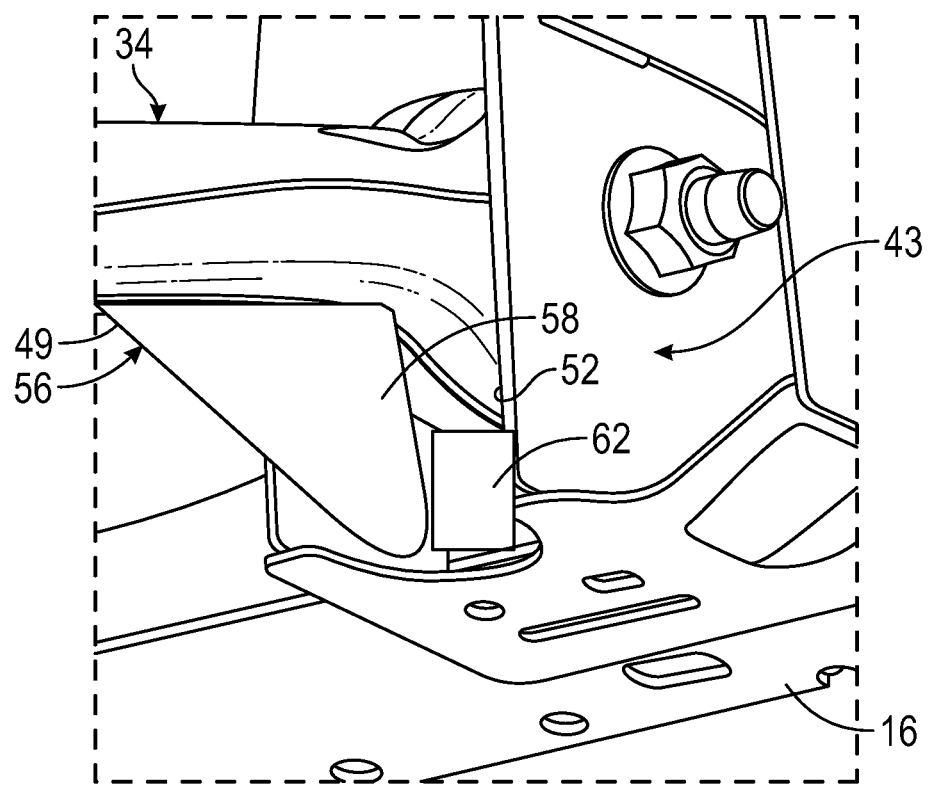
FIG. 3 is a partial perspective view of the suspension system of FIG. 2, in accordance with a non-limiting example.
Figure 4:
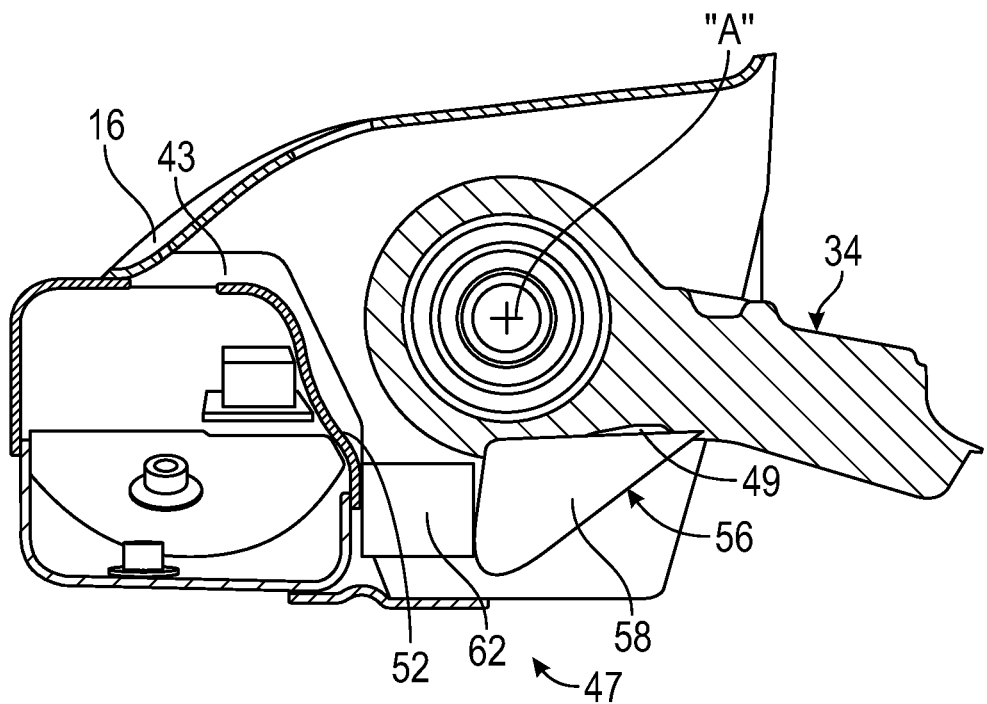
FIG. 4 partial cross-sectional side view of the suspension system of FIG. 3, in accordance with a non-limiting example.

Referring to FIGS. 2, 3 and 4 and with continued reference to FIG. 1, suspension system 20 includes a first suspension component 29 connected to a second suspension component 31. First suspension component 29 may define a lower control arm 34 that is mechanically connected to frame 16 and to an upper control arm 37 via a steering knuckle 40. Second suspension component 31 may take the form of a lower control arm support 43 that forms part of frame 16. A spring (not shown) may be connected between lower control arm 34 and a spring tower 45 coupled to frame 16. The spring may take on a variety of forms and may be coupled with a dampener (also not shown) such as a shock absorber. The spring is designed to support the weight of vehicle 10 and absorb jounce and rebound forces associated with travel over a roadway.

Suspension system 20 also includes a rebound control mechanism 47 that operates to absorb lift forces due to longitudinal acceleration of vehicle 10 so as to maintain a clear line of sight for a driver in passenger compartment 18 and maintain normal forces on front tires to maintain traction. In a non-limiting example, lower control arm 34 includes a lower surface 49 and lower control arm support 43 includes a surface portion 52. Lower control arm 34 is pivotally connected to lower control arm support 43 about an axis "A". Lower control arm 34 includes a feature 56 shown in the form of a paddle 58 that may be cantilevered from lower surface 49. While shown as a paddle 58, feature 56 may take on a variety of forms.

In a non-limiting example, a spring element 62 is mounted to surface portion 52 of lower control arm support 43. Paddle 58 is arranged so as to engage with spring element 62 when longitudinal acceleration forces generated by vehicle 10 exceed a predetermined level. Spring element 62 may be formed from a variety of substances including microcellular urethane (MCU), thermoplastic polyurethane (TPU), rubber and the like. The materials may be specifically designed, sized, and oriented to include either linear or non-linear spring rates that cannot be achieved with coil springs. Thus, the use of spring elements that are not packaged within a damper allow for the use of higher spring rates that can respond faster and generate more force than traditional spring/shock absorber or MacPherson strut arrangements in order to limit upward travel of body due to longitudinal acceleration forces and also improve steering, handling, roll control and structural feel of the vehicle.

Figure 5:
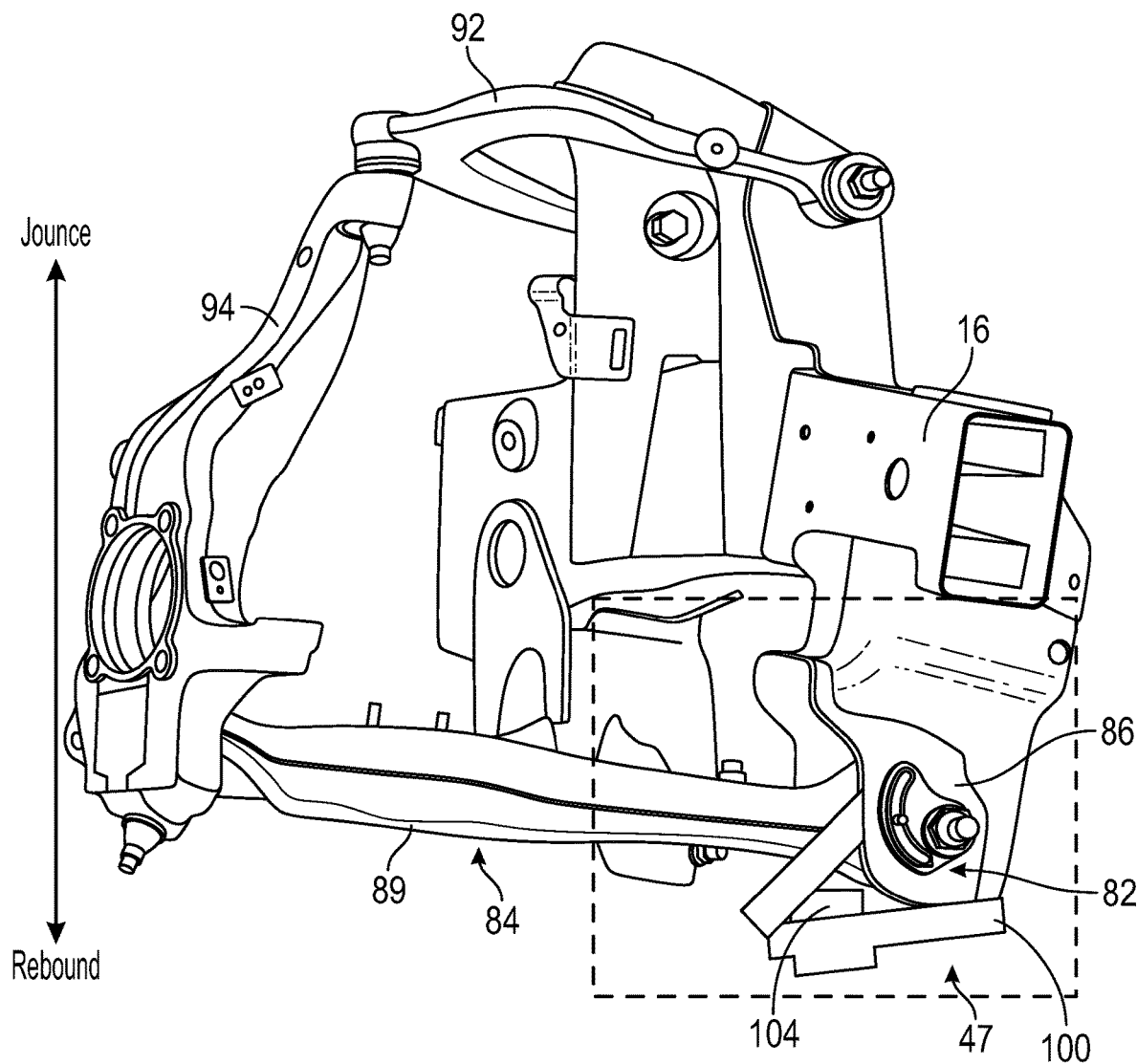
FIG. 5 depicts the suspension system integrated between a lower control arm and a frame of the vehicle, in accordance with another non-limiting example.
Figure 6:
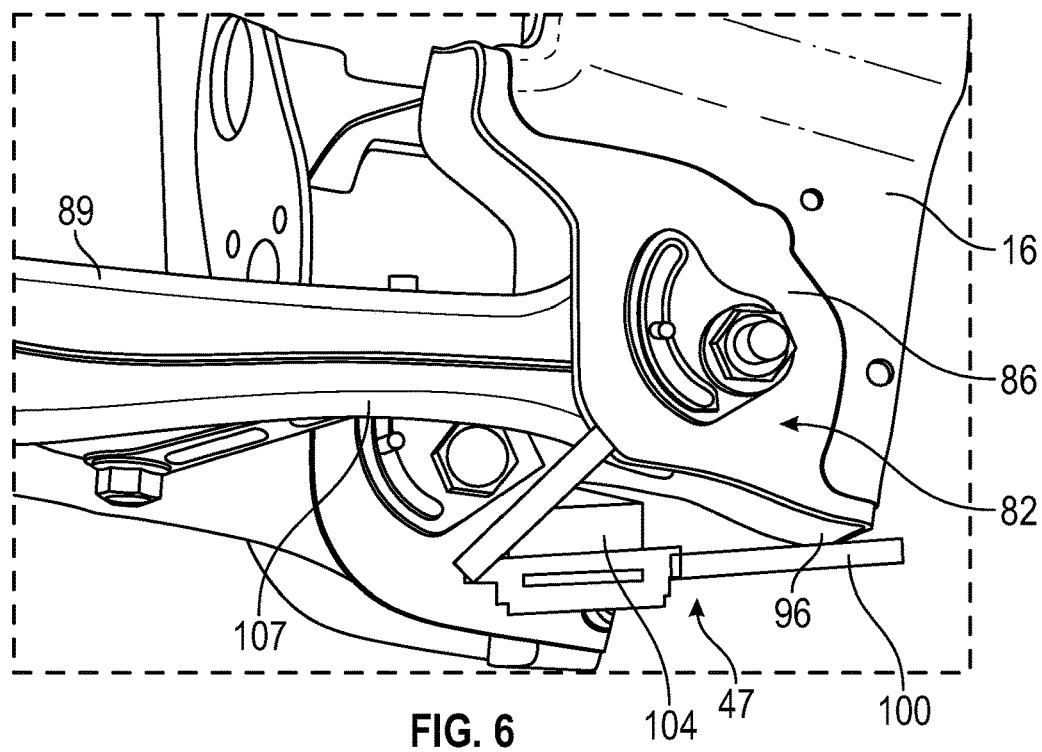
FIG. 6 is a partial perspective view of the suspension system of FIG. 5, in accordance with a non-limiting example.

Reference will now follow to FIGS. 5 and 6 and with continued reference to FIG. 1, in describing rebound control mechanism 47 in accordance with another non-limiting example. Rebound control mechanism 47 includes a first suspension component 82 and a second suspension component 84. First suspension component 82 may take the form of a lower control arm support 86 integrated into frame 16. Second suspension component 84 may take the form of a lower control arm 89. In a manner similar to that discussed herein, lower control arm 89 is coupled to an upper control arm 92 via a steering knuckle 94. Lower control arm support 86 includes a lower surface 96 that supports a bracket 100. Bracket 100 is cantilevered from lower surface 96 and supports rebound control spring element 104.

In a non-limiting example, spring element 104 is designed to absorb acceleration forces. That is, lower control arm 89 includes a lower surface portion 107 that is oriented to engage spring element 104 when acceleration forces generated by vehicle 10 exceed a predetermined threshold. Spring element 104 may be formed from a variety of substances including microcellular urethane (MCU), thermoplastic polyurethane (TPU), rubber and the like. The materials may be specifically designed, sized, and oriented to include either linear or non-linear spring rates that cannot be achieved with coil springs. Thus, the use of spring elements that are not packaged with a damper allows for the use of higher spring rates that can respond faster and generate higher forces than traditional spring/shock absorber or MacPherson strut arrangements to acceleration forces.

Figure 7:
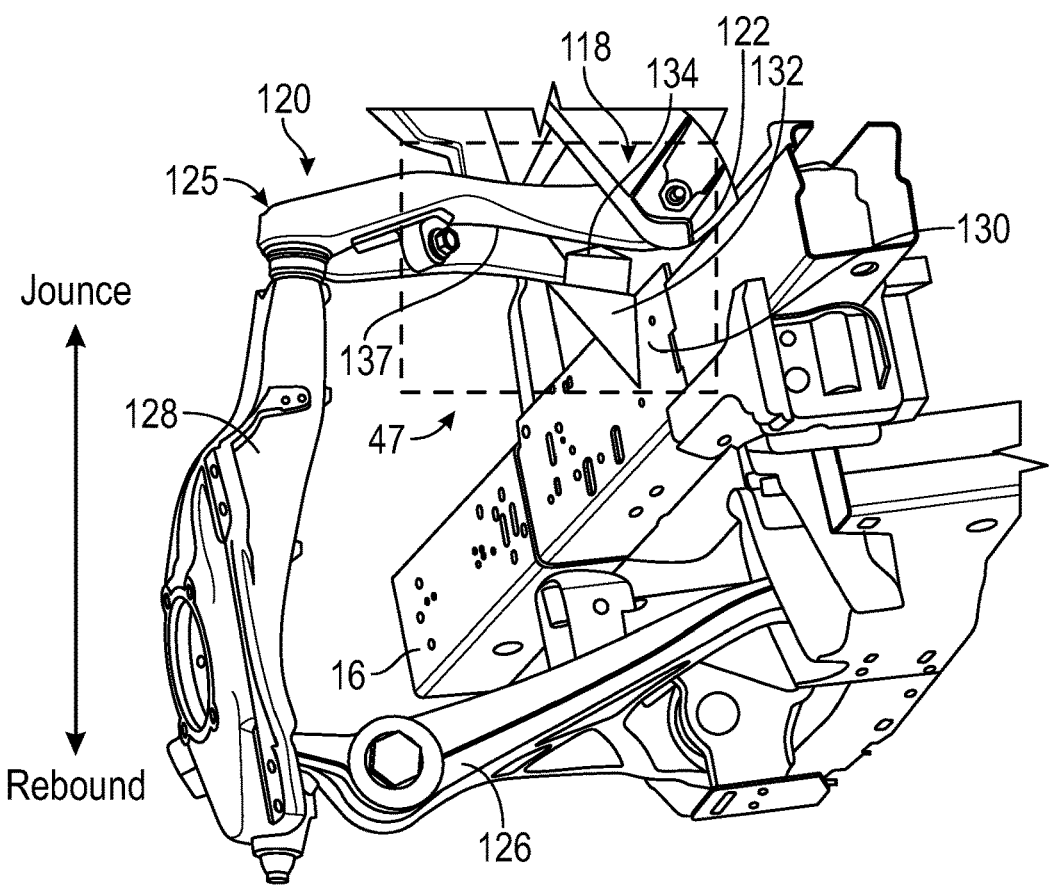
FIG. 7 depicts the suspension system with a rebound control device integrated between an upper control arm and the frame/body of the vehicle, in accordance with yet another non-limiting example.
Figure 8:
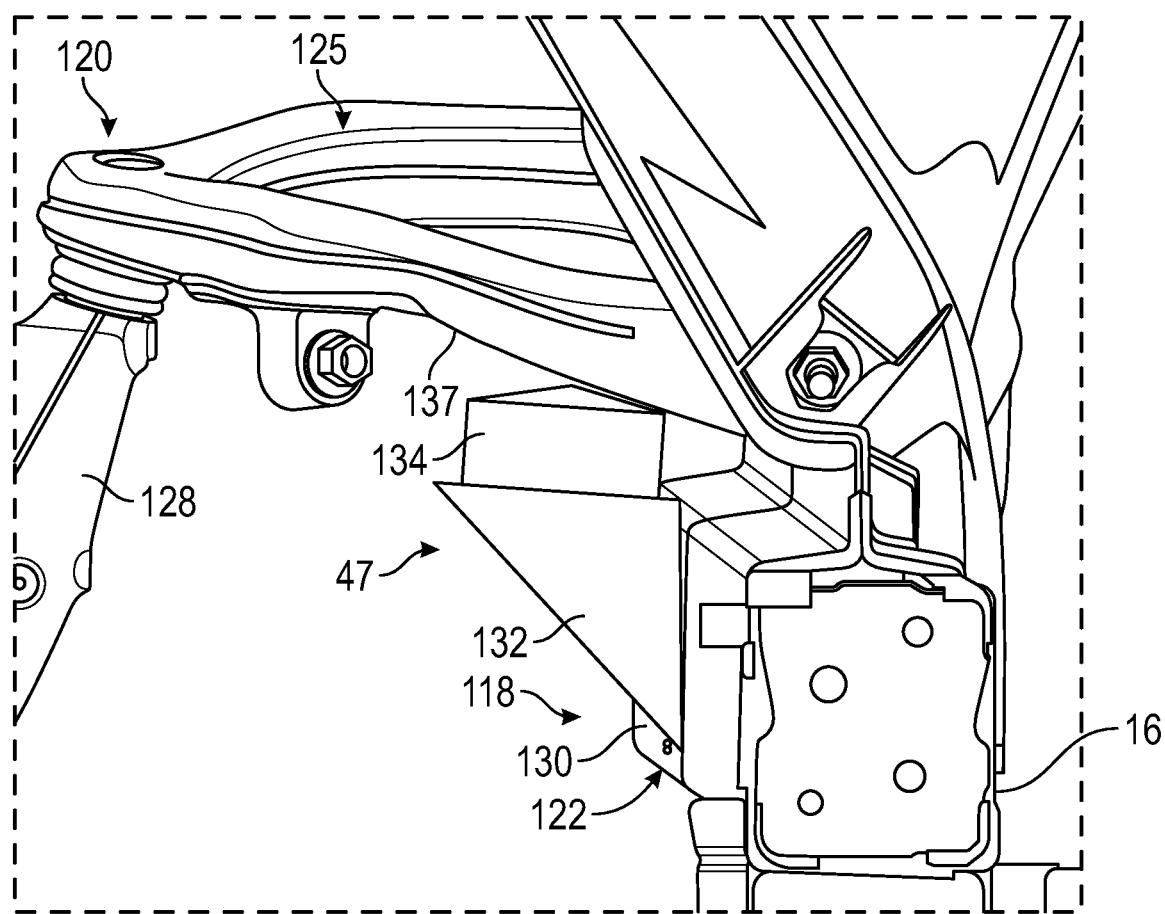
FIG. 8 depicts a partial perspective view of the suspension system of FIG. 7, in accordance with a non-limiting example.

Reference will now follow to FIGS. 7 and 8 with continued reference to FIG. 1 in describing rebound control mechanism 47 in accordance with yet another non-limiting example. Rebound control mechanism 47 includes a first suspension component 118 and a second suspension component 120. First suspension component 118 may take the form of an upper control arm support 122 integrated into frame 16. Second suspension component 120 may take the form of an upper control arm 125. Upper control arm 125 is connected to a lower control arm 126 through a steering knuckle 128. In a non-limiting example, upper control arm support 122 includes a surface 130 that supports a bracket 132. Bracket 132 is cantilevered from surface 130 and supports a spring element 134.

In a non-limiting example, spring element 134 is designed to absorb suspension forces due to longitudinal acceleration forces on the body. That is, upper control arm 125 includes a lower surface portion 137 that is arranged to engage with spring element 134 when longitudinal body acceleration forces generated by vehicle 10 exceed a predetermined threshold. Spring element 134 may be formed from a variety of substances including microcellular urethane (MCU), thermoplastic polyurethane (TPU), rubber and the like. The materials may be specifically designed, sized, and oriented to include either linear or non-linear spring rates that cannot be achieved with coil springs. Thus, the use of spring elements 134 that are not packaged with a damper allows for the use of higher spring rates that can respond faster and generate higher forces than traditional spring/shock absorber or MacPherson strut arrangements in order to limit upward travel of body due to longitudinal acceleration forces and also improve steering, handling, roll control and structural feel of the vehicle.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle suspension system for a vehicle having a body supported on a frame comprising:
   a first suspension component having a surface and a bracket cantilevered from the surface;
   a second suspension component including a surface portion; and
   a spring element cantilevered from one of the bracket and the surface portion of the second suspension component, wherein interaction between the spring element and another of the bracket and the surface portion of the second suspension component limits upward travel of the body of the vehicle.

2. The vehicle suspension system according to claim 1, wherein the first suspension component is pivotally mounted to the frame and the second suspension component includes a portion of the frame.

3. The vehicle suspension system according to claim 2, wherein the surface defines a lower surface of the first suspension component.

4. The vehicle suspension system according to claim 3, wherein the first suspension component comprises a lower control arm.

5. The vehicle suspension system according to claim 4, wherein the bracket comprises a paddle cantilevered from the lower surface of the lower control arm and the spring element is mounted to the surface portion of the second suspension component.

6. The vehicle suspension system according to claim 5, wherein the second suspension component comprises the frame.

7. The vehicle suspension system according to claim 1, wherein the second suspension component is pivotally mounted to the frame.

8. The vehicle suspension system according to claim 7, wherein the first suspension component comprises the frame and the second suspension component comprises one of an upper control arm and a lower control arm.

9. The vehicle suspension system according to claim 8, wherein the surface portion comprises a lower surface portion of the one of the upper control arm and the lower control arm.

10. The vehicle suspension system according to claim 9, wherein the spring element is mounted to the bracket.

11. A vehicle comprising:
    a frame;
    a body supported by the frame;
    a plurality of wheels connected to the frame; and
    a suspension system operatively connected between the plurality of wheels and the frame, the suspension system comprising:
      a first suspension component having a surface and a bracket cantilevered from the surface;
      a second suspension component including a surface portion; and
      a spring element cantilevered from one of the bracket and the surface portion of the second suspension component, wherein interaction between the spring element and another of the bracket and the surface portion limits upward travel of the body of the vehicle.

12. The vehicle according to claim 11, wherein the first suspension component is pivotally mounted to the frame and the second suspension component includes a portion of the frame.

13. The vehicle according to claim 12, wherein the surface defines a lower surface of the first suspension component.

14. The vehicle according to claim 13, wherein the first suspension component comprises a lower control arm.

15. The vehicle according to claim 14, wherein the bracket comprises a paddle cantilevered from the lower surface of the lower control arm and the spring element is mounted to the surface portion of the second suspension component.

16. The vehicle according to claim 15, wherein the second suspension component comprises the frame.

17. The vehicle according to claim 11, wherein the second suspension component is pivotally mounted to the frame.

18. The vehicle according to claim 17, wherein the first suspension component comprises the frame and the second suspension component comprises one of an upper control arm and a lower control arm.

19. The vehicle according to claim 18, wherein the surface portion comprises a lower surface portion of the one of the upper control arm and the lower control arm.

20. The vehicle according to claim 19, wherein the spring element is mounted to the bracket.

\* \* \* \* \*